US005666734A

United States Patent [19]

Morrison

[11] Patent Number: 5,666,734

[45] Date of Patent: Sep. 16, 1997

[54] GUIDE BAR CODING SYSTEM

[75] Inventor: Robert L. Morrison, Shreveport, La.

[73] Assignee: WCI Outdoor Products, Inc., Cleveland, Ohio

[21] Appl. No.: 699,889

[22] Filed: Aug. 16, 1996

[51] Int. Cl.$^6$ ............................ B23D 59/00; B27B 17/02

[52] U.S. Cl. ................................................ 30/387; 30/383

[58] Field of Search ............................. 30/383, 384, 385, 30/386, 387; 83/701, 522.11, 802, 821

[56] References Cited

U.S. PATENT DOCUMENTS

| | | | |
|---|---|---|---|
| 3,545,505 | 12/1970 | De Wesse et al. | 83/821 |
| 3,810,408 | 5/1974 | Taira et al. | 30/387 |
| 4,430,795 | 2/1984 | Wetzel et al. | 30/387 |
| 4,693,007 | 9/1987 | Apfel et al. | 30/387 |
| 4,873,903 | 10/1989 | Harfst . | |
| 4,903,410 | 2/1990 | Wieninger et al. | 30/387 |
| 4,961,263 | 10/1990 | Apfel et al. | 30/387 |
| 5,014,435 | 5/1991 | Date et al. | 30/387 |
| 5,025,561 | 6/1991 | Sugihara et al. | 30/387 |
| 5,035,058 | 7/1991 | Date et al. | 30/387 |
| 5,042,350 | 8/1991 | Nitschmann | 83/522.11 |
| 5,249,363 | 10/1993 | Mitrega et al. | 30/387 |
| 5,271,157 | 12/1993 | Wieninger et al. | 30/387 |
| 5,395,291 | 3/1995 | Fanning . | |
| 5,426,854 | 6/1995 | Leini et al. . | |

*Primary Examiner*—Hwei-Siu Payer
*Attorney, Agent, or Firm*—Pearne, Gordon, McCoy & Granger LLP

[57] ABSTRACT

A guide bar coding system which permits a user to easily and correctly match a saw chain to a saw guide bar. The guide bar has a laminate or multi-layer structure, and includes a recessed surface that is colored or painted to define guide bar indicia which is indicative of characteristics of the guide bar. Replacement saw chains have saw chain indicia which indicate characteristics of the saw chain. A user selects an appropriate replacement saw chain by matching the saw chain indicia to the guide bar indicia.

23 Claims, 2 Drawing Sheets

GUIDE BAR CODING SYSTEM

BACKGROUND OF THE INVENTION

1. Field of the Invention

The present invention generally relates to chain saws and, more particularly, to chain saw guide bars.

2. Description of Related Art

Guide bars for chain saws have developed over the years to conventionally include a laminate structure wherein a plurality of steel plates are welded or otherwise adhered to one another to define a guide bar. Such a laminate structure is preferred over solid, single piece guide bars due to the fact that improved strength/weight characteristics can be provided.

Chain saw guide bars also provide a peripheral groove in which the saw chain is movably disposed. A distal end of the guide bar includes a pulley or sprocket which receives the chain and guides the chain as it moves around the guide bar. Each guide bar and guide bar sprocket is designed to receive a corresponding saw chain having, for example, an appropriate width dimension and a certain pitch or spacing between the chain links. As such, saw chains must be matched to the guide bars and, thus, it is necessary for the user or consumer, when replacing a worn or broken saw chain, to select a correctly-sized saw chain to be used with the guide bar.

Although this may seem to be a simple matter, most home owners use their chain saws infrequently and, therefore, tend to be unfamiliar with the specific saw chain that must be used when replacement becomes necessary. Therefore, there exists a need in the art for a device and method for reliably corresponding or matching the saw chain to the guide bar. There also exists a need in the art for guide bars which include some indication of a graphical nature which will allow the user or consumer to readily select an appropriate replacement saw chain.

SUMMARY OF THE INVENTION

The present invention is directed toward a coding system which enables the user to readily and correctly match a replacement saw chain to an existing chain saw guide bar. The present invention is further directed toward a guide bar including indicia which aides the user in selecting the appropriately-sized replacement saw chain.

The guide bar has a laminate structure, including an inner layer or plate member which is sandwiched between a pair of outer layers or plate members. At least one of the outer plate members has an opening formed therein through which a surface of the inner plate member is visible. The visible surface of the inner member is preferably painted or otherwise colored or marked to define indicia which is used to select an appropriate or corresponding replacement saw chain.

In further accordance with the present invention, the outer plate member opening is filled with a plug member. The plug member is transparent to permit visualization of the indicia on the inner plate member surface. Alternatively, the plug member may include indicia in the form of a colored/marked portion which is either molded into or otherwise integrally formed with the plug member, or secured to an inner end thereof. The plug member also may have indicia in the form of pigmentation throughout its length and, therefore, will continuously provide the desired indicia despite wearing thereof.

In further accordance with the present invention, a saw chain includes indicia in the form of a painted, colored, or otherwise marked link. The saw chain indicia is preferably on a non-cutting link, which may be the chain master link, and is indicative of characteristics of the saw chain, such as size, length, pitch, spacing, etc. Alternatively, a replacement saw chain may be contained in a package having indicia thereon which matches the indicia on the guide bar. Corresponding saw chains and guide bars have identical indicia to facilitate selection of appropriate replacement saw chains.

In further accordance with the present invention, a guide bar for a chain saw includes indicia which is disposed at a location which is not subject to wear during use of the chain saw. The indicia is preferably located on a non-friction surface of the guide bar and, more specifically, on a surface which is recessed from an outer or friction surface which engages work being cut by the saw chain. The guide bar indicia is indicative of characteristics of the guide bar, including size, length, sprocket teeth pitch and spacing, etc., and assists the user in selecting a corresponding replacement chain.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

Figure 1:
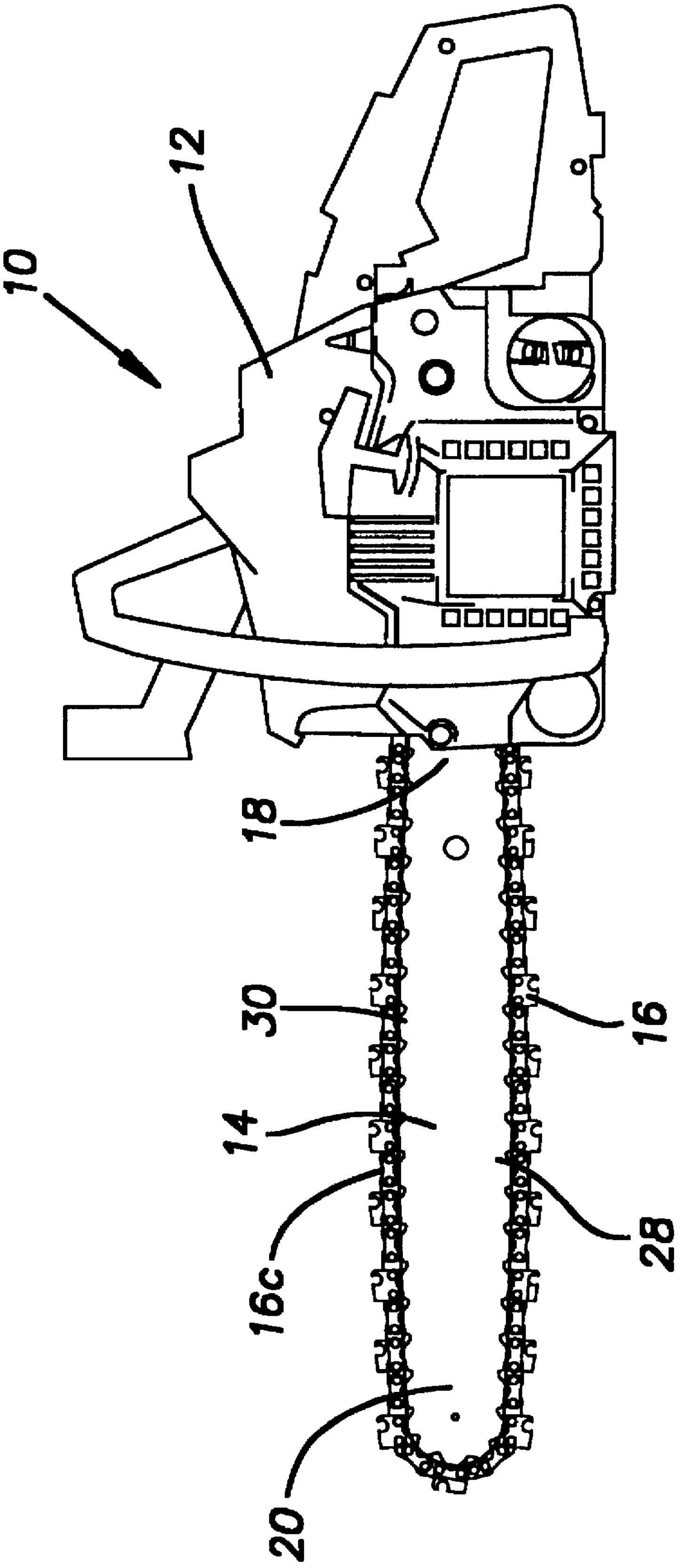
FIG. 1 is a perspective view of a chain saw, including a guide bar, according to the present invention.

With reference to FIG. 1, a chain saw 10 according to the present invention is illustrated. The chain saw 10 includes a housing 12 which surrounds an engine (not shown). A guide bar 14 projects outwardly from the chain saw housing 12. An endless-type saw chain 16 is driven by the engine around the guide bar 14.

The guide bar 14 has a first or rear end 18 rigidly mounted to the saw housing 12 or engine, and a second, nose, or front end 20 remote from the saw housing 12. The second end 20 includes an idler sprocket (not shown) which receives the chain. Relatively behind the first or rear end 18 of the guide bar 14, an engine crankshaft (not shown) has a clutched drive sprocket (not shown) attached thereto. The drive sprocket drives the saw chain 16 around the guide bar 14. The guide bar 14 defines a peripheral groove (FIG. 3) within which the saw chain 16 moves.

Figures 2, 3, 4:
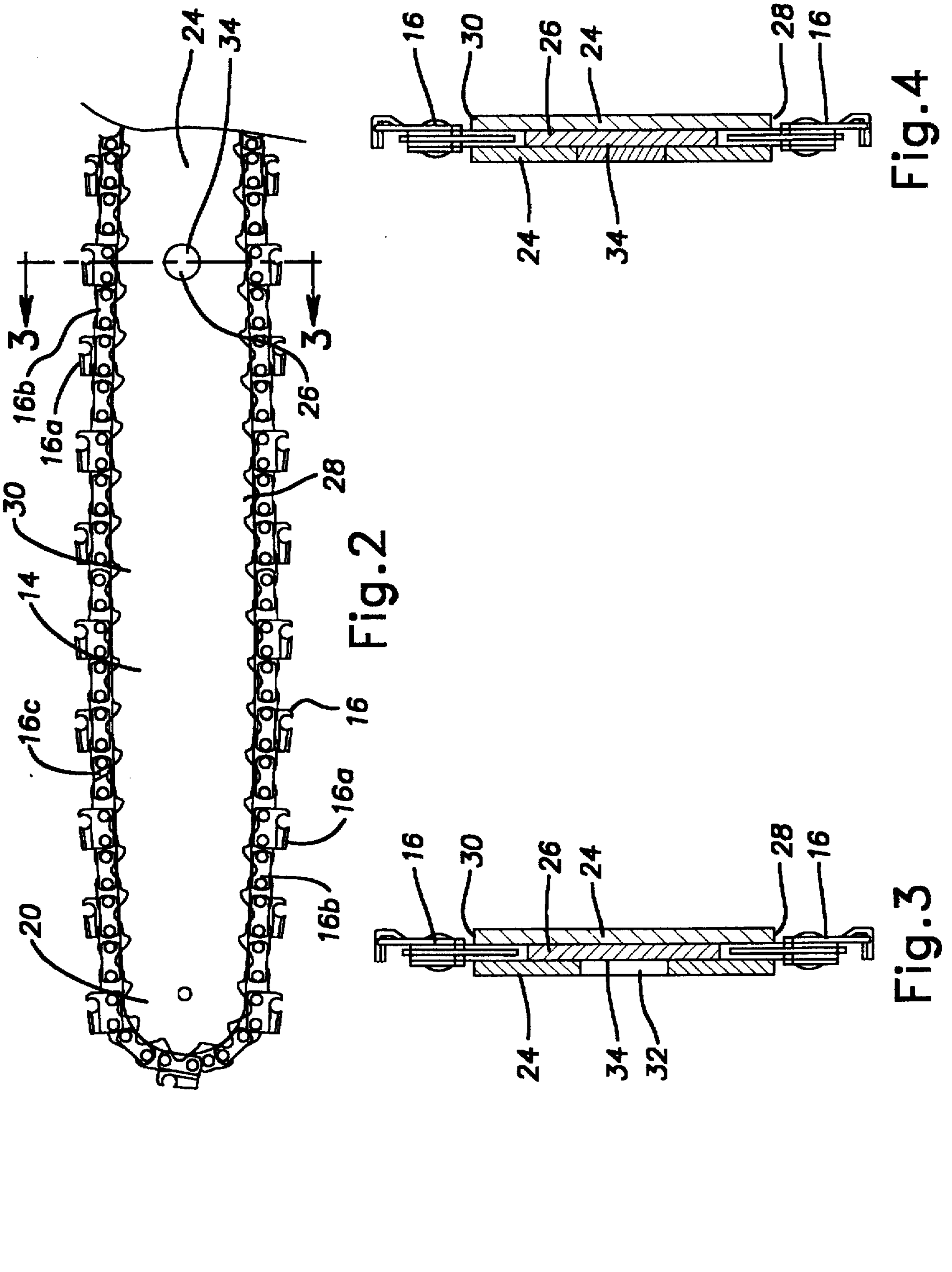
FIG. 2 is a front elevational view of a chain saw guide bar and saw chain according to the present invention.
FIG. 3 is a cross-sectional view of the guide bar as seen along line 3—3 of FIG. 2.
FIG. 4 is a cross-sectional view of a second embodiment of the guide bar according to the present invention.

As shown best in FIG. 3, the guide bar 14 is formed as a three-piece laminate, having a pair of outer layers or plate members 24 and an inner layer or plate member 26. The inner plate member 26 is sandwiched between the outer plate members 24 and secured to each of the outer plate members 24 by welding, adhesives, mechanical fasteners such as rivets or bolts, or other well known means of attachment.

Each of the plate members 24, 26 have a length dimension from the first end 18 to the second end 20 of the guide bar 14, and a height dimension from a lower edge 28 to an upper edge 30 of the guide bar 14. The outer plate members 24 are dimensionally identical to each other. The inner plate member 26 has a slightly smaller height and length dimension as compared to the outer plate members 24. As such, the upper and lower edges of the inner plate member 26 are recessed relative to those of the outer plate members 24, and the plate members 24, 26 thereby cooperate to define the peripheral groove 22 which receives and guides the saw chain 16 as it moves around the guide bar 14. The reduced length dimension of the inner plate member 26 (as compared to the outer plate members 24) permits the idler sprocket to be installed at the nose or second end 20 of the guide bar 14 relatively between the outer plate members 24.

With reference to FIGS. 2 and 3, the guide bar 14 and saw chain 16 are specifically illustrated. As discussed previously, the guide bar 14 includes the inner and outer plate members 26, 24. The inner plate member 26 is affixed on opposite lateral sides thereof to each of the outer plate members 24. The outer plate members 24 extend upwardly and downwardly relatively farther than the inner plate member 26, and thereby cooperate with the inner plate member 26 to define the peripheral groove 22 of the guide bar 14.

At least one of the outer plate members 24 has an opening 32 formed therein through which a surface 34 of the inner plate member 26 is visible. For ease of manufacturing, the opening 32 is preferably circular, but may be any desired geometric shape. The surface 34 of the inner plate member includes indicia which, preferably, is a colored material such as paint or an adhesive backed sticker. The indicia is indicative of characteristics of the guide bar. Such characteristics may include size, length, sprocket teeth pitch and spacing, etc., and assists the user in selecting a corresponding replacement saw chain, as will be described more fully hereafter. The indicia or surface 34 of the inner plate member 26 is visible to the user via the hole or opening 32 in the outer plate member 24. The indicia may be placed on the inner plate member surface 34 prior, or subsequent to, attachment of the inner plate member 26 to the outer plate members 24.

An alternative embodiment is illustrated in FIG. 4, wherein the opening 32 in the outer plate member 24 is filled with a plug member 36. The plug member 36 is preferably formed from a material which is transparent to light, i.e., plastic, ceramic, etc., and, therefore, permits the user to view the guide bar indicia on the underlying surface 34 of the inner plate member. Alternatively, the plug member 36 may have such indicia on a portion or member (not shown) molded therein, or attached to an inner surface thereof (i.e., the surface adjacent the inner plate member 26). Also, the plug member 36 may be formed from a material that has the desired indicia (i.e., color) throughout, so that the plug member 36, even if worn, would exhibit the necessary indicia or color to permit the user to select the appropriate saw chain 16, in the manner to be described hereinafter. The outer surface of the plug member 36 may be flush with or, preferably, slightly recessed, from the outer surface of the outer plate member 24. The plug member 36 may be formed from a low-friction type material, or may include low friction-type materials therein.

The plug member 36 is preferably inserted into the opening 32 after the outer plate members 24 are secured to the inner plate member 26. The plug member 36 may, alternatively, be inserted into the opening prior to attachment of the outer plate members 24 to the inner plate member 26. The plug member 36 is retained within the opening 32 by adhesives, or by a frictional interference-type fit. Alternatively, the plug member 36 may include fastening tabs (not shown) which snap into corresponding recesses (not shown) in the guide bar 14. Other means of mechanically attaching the plug members 36 to the guide bar 14 are contemplated and within the scope of the present invention.

As should be apparent from the foregoing, numerous alternatives are envisioned to be useful to provide the desired indicia for the guide bar/saw chain marking or coordinating system of the present invention. Further, it is considered apparent that the preferred color marking could be replaced by graphical, alphanumeric, or symbolic-type marking schemes. Therefore, these various described alternatives for marking the guide bar are hereinafter collectively referred to as the guide bar indicia.

As will be apparent to those skilled in the art, during usage of the chain saw 10, the outer or exterior surfaces of the outer plate members 24 come into sliding contact with the wood being cut. Therefore, after a short period of use, the exterior surfaces of the outer plate members 24 are typically scratched, worn, or otherwise marred. However, with regard to the embodiment shown in FIG. 3, the guide bar indicia (i.e., surface 34 of the inner plate member 26) is recessed or in-set relative to the exterior surfaces of the outer plate members 24 and, therefore, does not usually come into contact with the wood being cut and is thus is protected from being damaged during use of the chain saw 10. With regard to the embodiment shown in FIG. 4, the plug member 36 further isolates and protects the guide bar indicia from damage, and prevents dirt, dust, and other material from accumulating in the opening 32. Naturally, the plug member 36 which integrally includes the guide bar indicia therein will also not be damaged, in a functional sense, during use of the chain saw.

The saw chain 16 includes a series of cutting links **16*a* and non-cutting links 16*b*. At least one of the links and, preferably, one of the non-cutting links 16*b*, has indicia thereon which matches the guide bar indicia. The saw chain indicia is indicative of characteristics of the saw chain such as size, length, pitch, spacing, etc. The link on which the saw chain indicia is provided will be referred to hereinafter as the colored link 16*c*, and is generically shown in FIGS. 1 and 2. The colored link 16*c* is preferably painted or otherwise marked, but is otherwise preferably identical to the other chain links. Unfortunately, the paint or markings on the colored link 16*c* tends to wear during use, and may be completely worn off when the saw chain 16** needs to be replaced.

Fortunately, with the guide bar 14 according to the present invention, the user merely has to select a replacement chain which has a colored link **16*c* with saw chain indicia that matches the guide bar indicia. Alternatively, a container or wrapper in which the replacement saw chain is packaged can have indicia thereon which matches the guide bar indicia. In this alternative it is not necessary, but may be desirable, for the replacement saw chain packaged within a container or wrapper having saw chain indicia thereon, to also have saw chain indicia in the form of the previously described colored link 16*c*** to further reassure the user that the correct saw chain has been selected.

It is further contemplated that the colored link **16*c* could be a master link of the saw chain, and that the master link could be formed from a different material than the rest of the saw chain links. Such a different material would preferably have pigmentation throughout its thickness such that wearing of the colored link 16*c* will not degrade the saw chain indicia provided by the colored chain link 16*c*. However, as noted above, although such a colored link 16*c* may be desired, it is not necessary with the guide bar 14** according to the present invention.

It is contemplated that various modifications, substitutions, improvements, and replacements of parts may be resorted to without departing from the scope of the present invention. The present invention has been described in the foregoing with particularity to disclose the preferred embodiment(s) of the present invention currently contemplated. However, the scope of the present invention is not limited merely to the disclosed and preferred embodiment (s), but rather includes everything that falls within the scope of the appended claims, including equivalents thereof. For example, although a single opening 32 in the outer plate members 24 is described herein, it is contemplated that plural openings, through which the guide bar indicia are visible, could be employed. It is also contemplated that a hole could extend completely through the guide bar (i.e., through the inner and outer plate members) and the hole filled with an elongated plug member which would extend generally through the guide bar and integrally provide the guide bar indicia.

What is claimed is:

1. A chain saw, comprising:

a housing;

a guide bar extending from said housing, said guide bar including guide bar indicia indicative of characteristics of said guide bar; and, a saw chain extending around said guide bar, said saw chain including saw chain indicia indicative of characteristics of said saw chain, wherein said guide bar indicia and said saw chain indicia are identical to one another.

2. A chain saw according to claim 1, wherein said guide bar includes an inner layer sandwiched between a pair of outer layers, at least one of said outer layers having an opening therein through which said guide bar indicia is observable.

3. A chain saw according to claim 2, wherein said guide bar indicia is disposed upon a surface of said inner layer.

4. A chain saw according to claim 2, wherein said opening is at least partially filled by a plug member.

5. A chain saw according to claim 4, wherein said plug member is transparent and said guide bar indicia is disposed upon a surface of said inner layer.

6. A chain saw according to claim 4, wherein said plug member includes said guide bar indicia.

7. A chain saw according to claim 4, wherein said plug member is transparent and said guide bar indicia is provided relatively between said plug member and a surface of said inner layer.

8. A guide bar for a chain saw, comprising:

an inner layer sandwiched between a pair of outer layers, at least one of said outer layers having an opening therein, a guide bar indicia being observable via said opening, said guide bar indicia being indicative of characteristics of said guide bar.

9. A guide bar according to claim 8, wherein said indicia is disposed upon a surface of said inner layer.

10. A guide bar according to claim 9, wherein said inner layer surface is painted, said painted surface defining said indicia.

11. A guide bar according to claim 8, wherein said opening is at least partially filled by a plug member.

12. A guide bar according to claim 11, wherein said plug member is transparent and said indicia is disposed upon a surface of said inner layer.

13. A guide bar according to claim 11, wherein said plug member includes said indicia.

14. A guide bar according to claim 11, wherein said plug member is transparent and said indicia is provided relatively between said plug member and a surface of said inner layer.

15. A method for selecting a correct replacement saw chain for a chain saw from a plurality of replacement saw chains, said chain saw including a guide bar having indicia thereon indicative of characteristics of said guide bar, each of said plurality of replacement saw chains having indicia associated therewith indicative of characteristics of said replacement saw chain, comprising the steps of:

viewing the guide bar indicia;

viewing said plurality of replacement saw chain indicia;

selecting a replacement saw chain having indicia which matches said guide bar indicia.

16. A method according to claim 15, wherein said guide bar indicia is disposed at a non-friction surface of said guide bar.

17. A method according to claim 16, wherein said guide bar indicia is a painted, recessed surface of said guide bar.

18. A method according to claim 15, wherein said replacement saw chain indicia is disposed on a non-cutting link of said replacement saw chain.

19. A method according to claim 15, wherein said replacement saw chain indicia is provided on a package in which the replacement saw chain is located.

20. A method of making a chain saw guide bar, said guide bar comprising a pair of outer plates and an inner plate, comprising the steps of:

forming an opening through one of said pair of outer plates;

positioning said inner plate between said outer plates;

attaching said inner plate to said outer plates; and, placing indicia within said opening, said indicia being indicative of characteristics of said guide bar.

21. A method according to claim 20, wherein a surface of said inner plate is exposed via said opening and said placing step is accomplished by a painting said surface.

22. A method according to claim 20, comprising the further step of inserting a plug member into said opening, said plug member being transparent.

23. A method according to claim 20, wherein said placing step is accomplished by inserting a plug member into said opening, said plug member including said indicia.

* * * * *